No. 714,605. Patented Nov. 25, 1902.
D. L. POTTER.
MEANS FOR ATTACHING COLLARS OR PULLEYS TO SHAFTING.
(Application filed Mar. 25, 1902.)
(No Model.)

Witnesses
L. G. Handy
A. B. Williams

Inventor
Duane L. Potter
By
Attorneys

UNITED STATES PATENT OFFICE.

DUANE L. POTTER, OF CLIFFORD, PENNSYLVANIA.

MEANS FOR ATTACHING COLLARS OR PULLEYS TO SHAFTING.

SPECIFICATION forming part of Letters Patent No. 714,605, dated November 25, 1902.

Application filed March 25, 1902. Serial No. 99,951. (No model.)

*To all whom it may concern:*

Be it known that I, DUANE L. POTTER, a citizen of the United States, residing at Clifford, in the county of Susquehanna and State of Pennsylvania, have invented certain new and useful Improvements in Means for Attaching Collars or Pulleys to Shafting; and I do hereby declare the following to be a full, clear, and exact description of the invention, such as will enable others skilled in the art to which it appertains to make and use the same.

My invention relates to split collars or pulleys for shafting.

The object of my invention is the production of a split collar or pulley for shafting for sustaining a saw-arbor or other device longitudinally upon the shaft and retaining it in its proper place and permitting the said collar or pulley to be readily applied to or removed from the shafting without interfering with the other machinery or parts carried by the shafting.

A further object of my invention is the production of a collar or pulley of such a design that when the parts of the same are brought together to form a complete collar it will be absolutely impossible to separate the same without bringing the parts to a particular position for admitting of such separation and that when the parts are in position to form a complete collar said parts will be held against any lateral movement, even though one of the securing parts be removed.

A further object is to so construct and arrange the parts that mortise or tenon joints are produced at the separating ends or parts of the collar, and the securing-pin is applied at a point to one side of the line of separation, so that a very strong, positive, and continuous collar or pulley is secured without any depression in the outer periphery thereof and without use of an ordinary pin-hinge connection at one of the meeting faces of the separable sections of the collar.

Figure 1:
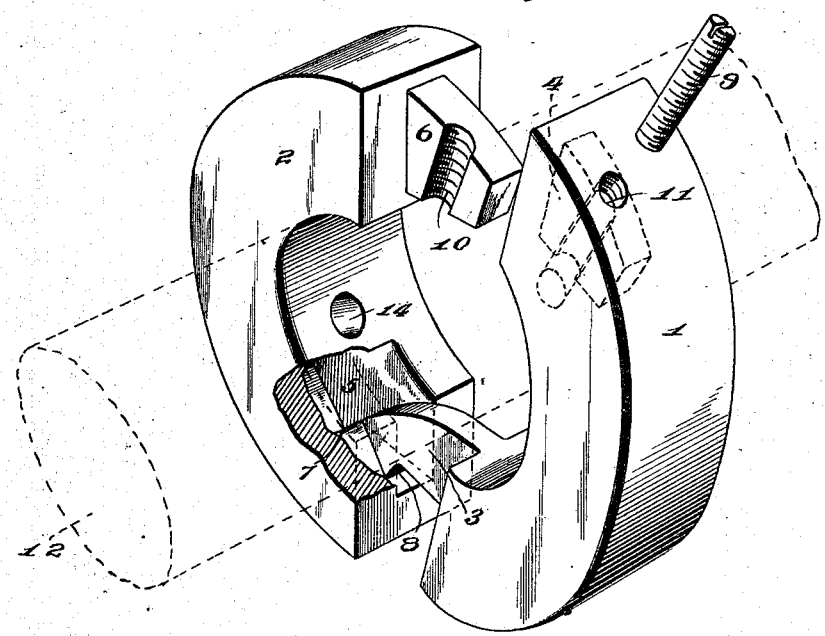
Figure 2:
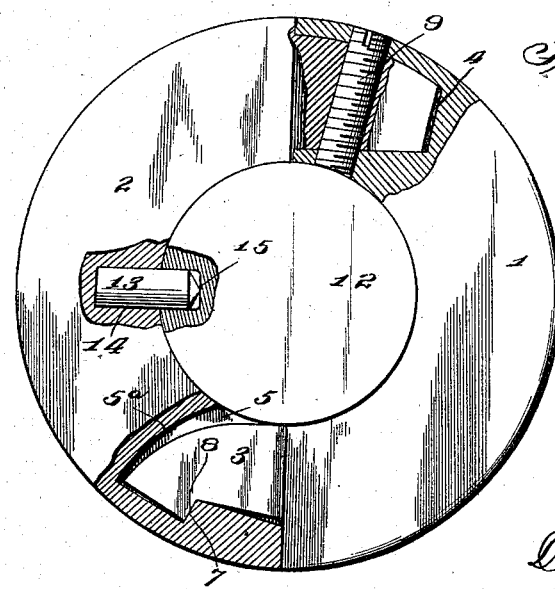

In the accompanying drawings, Figure 1 is a perspective view of a collar constructed in accordance with my invention, showing the parts separated; and Fig. 2 is a side elevation of the same, partly in section.

In operation with shafting it is well known that collars are employed for the purpose of sustaining pulleys or wheels longitudinally upon the shafting for retaining them in their proper position. These collars are also employed on shafting carrying circular saws, and such shafting, in addition to carrying the saw, carries a shrunk arbor, boxing collar, drum, or pulley, and feed or gear wheels. It is particularly important and necessary in shafting carrying a saw that the arbor and boxing should be held firmly in place, so as to prevent the saw having any endwise movement, which movement would heat the saw almost immediately during the sawing operation and hinder and finally prevent such further operation.

My device is designed to insure the saw from having any such movement and to permit the collar or pulley to be readily applied to and removed from the shafting; but of course it is obvious that it may be applied to any shafting irrespective of what is carried by the same.

My improved collar or pulley comprises two sections or members 1 and 2, as clearly shown in Fig. 1, the said sections being semicircular in outline and when brought together make a complete circle which is smooth and continuous on its outer surface, as well as at the bore or inner surface of the collar or pulley. The section or member 1 is provided with a tongue 3 on one of its ends and with a socket or recess 4 on its other end, and the section or member 2 is provided with a socket or recess 5 to receive and retain the tongue 3 of the member 1, as clearly shown, and the other end of the section or member 2 is provided with a tenon or tongue 6, which enters the mortise or socket 4 of the member 1. The socket or mortise 5 of the member 2 is provided with a shoulder 7, and the tongue or tenon 3 is provided with a shouldered or cut-out portion 8, which latter engages with the shoulder 7, formed in the recess 5. The upper wall of the recess portion 5 is curved, as at 5ª, and the tongue 3 is also curved so as to readily enter or pass in or out of the recess 5 in a pivoted or hinged manner. It will be observed that when the sections are together as in Fig. 2, with the shoulder 7 engaged by the shoulder 8 of the tenon 3 that it would be impossible to separate the sections, even when the pin 9 is not in position, without first separating the sections or members at the point where the tenon or tongue 6 enters the mortise 4—which is to say, the sections or members are positively locked against radial separation at the point where they come together, irrespective of the securing-pin 9, and could not be separated by simply pulling the sections apart on a straight line without first separating the sections at the point where the tenon 6 enters the mortise or recess 4, and thus differs from those collars or pulleys which separate alike at points of separation. By forming the sections or members with mortises and tenons a very strong and compact construction is secured which prevents the section from being moved laterally and all strain does not come upon the tongues or tenons. The tongue or tenon 6 of the member 2 is provided with a semicircular recess 10, and the mortise 4 of the member 1 is formed in one of its vertical walls with a semicircular recess 11, which registers with the semicircular recess 10 when the sections are together, and the walls of these recesses are preferably threaded, and the pin 9 is passed through the registering aperture, as clearly shown in Fig. 2, and by being screwed down tightly its lower end comes in contact with the shafting 12 and firmly impinges against the same. The sections being firmly locked, it is impossible for the collar to rotate or move laterally. However, to further guard against any liability of the collar or pulley having any movement on the shaft an additional pin, as 13, may be provided, which latter is seated in a recess 14, formed in one of the sections of the collar or pulley, and its other end inserted in a recess 15, provided in the shaft 12 for that purpose. Any suitable number of these pins may be employed.

An important feature of my construction is that the securing-pin 9 does not pass through the sections or members of the collar at the line of separation, but to one side thereof. This is important, for the reason that a much stronger construction is secured thereby and a construction not so likely to separate or become broken at the points of separation.

Another important feature is that by arranging the screw 9 in the position as employed by me it has no tendency whatever to weaken the joint, as in some constructions—that is to say, only one-half of the screw passing through the said tenon produces a firm and solid grip, which cannot be separated unless the screw be removed.

Having now described my invention, what I claim as new, and desire to secure by Letters Patent, is—

1. A split collar or pulley comprising in its construction two sections or members one of said sections being provided with a tongue having a head or shoulder and also with a mortise and the other section being provided with a mortise having a shoulder for engaging the head or shoulder on the tongue of the first-mentioned section and said second section being also provided with a tongue which enters the mortise in the first-mentioned section, and a pin engaging the two sections for locking the same against disengagement, substantially as described.

2. A split collar or pulley comprising in its construction two sections or members one of said sections being provided with a tongue having a head or shoulder on one of its ends and with a mortise on its other end, and the other section being provided on one of its ends with a mortise having a shoulder for engaging the head or shoulder on the tongue of the first-mentioned member and said second member being also provided with a tongue on its outer end which enters the mortise in the first-mentioned member, and a pin engaging the two sections by passing through the mortise and tenon to one side of the line of separation, substantially as described.

3. A split collar or pulley comprising in its construction two sections or members, one of said sections being provided with a tongue on one end and a mortise on the other, and the other section being provided with a mortise on one end and a tongue on the other, the last-mentioned tongue and mortise being provided with semicircular registering apertures and a pin passing through said registering apertures for locking the sections together, substantially as described.

4. A split collar or pulley comprising in its construction two sections or members, one of said sections being provided with a tongue on one end and a mortise on the other, and the other section being provided with a mortise on one end and a tongue on the other, the last-mentioned tongue and mortise being provided with semicircular registering apertures to one side of the line of separation of the sections and securing means extending into said apertures, substantially as described.

5. A split collar comprising two sections having their ends detachably secured together at one point of their separation, the other end of one of the sections being provided with a tongue and the corresponding end of the other section formed with a mortise for receiving the same, and a pin passed between said tongue and one wall of said mortise for locking the parts together, substantially as described.

In testimony whereof I hereunto affix my signature in presence of two witnesses.

DUANE L. POTTER.

Witnesses:
W. W. BAYLOR,
GEORGE BEER.